United States Patent
Rezvani et al.

(10) Patent No.: US 7,254,779 B1
(45) Date of Patent: Aug. 7, 2007

(54) CUSTOMIZABLE PRESENTATION ENVIRONMENT

(75) Inventors: Babak Rezvani, New York, NY (US); Jack L. Chen, Astoria, NY (US); Quang D. Nguyen, West Orange, NJ (US)

(73) Assignee: Xanboo Inc., New York, NY (US)

( * ) Notice: Subject to any disclaimer, the term of this patent is extended or adjusted under 35 U.S.C. 154(b) by 194 days.

(21) Appl. No.: 09/711,369

(22) Filed: Nov. 10, 2000

Related U.S. Application Data (60) Provisional application No. 60/230,300, filed on Sep. 6, 2000.

(51) Int. Cl.
*G06F 9/00* (2006.01)

(52) U.S. Cl. ............ 715/745; 715/744; 715/719; 715/806; 715/807; 715/826

(58) Field of Classification Search ............ 345/744, 345/745, 719, 806, 807, 826; 715/745, 744, 715/719, 806, 807, 826
See application file for complete search history.

(56) References Cited

U.S. PATENT DOCUMENTS

| | | | |
|---|---|---|---|
| 5,278,954 A | 1/1994 | Hohlfeld et al. ............ 395/164 |
| 5,835,094 A | 11/1998 | Ermel et al. ............ 345/355 |
| 5,986,654 A * | 11/1999 | Alexander et al. ............ 345/744 |
| 6,005,613 A * | 12/1999 | Endsley et al. ............ 348/231.6 |
| 6,035,323 A | 3/2000 | Narayen et al. ............ 709/201 |
| 6,366,296 B1 * | 4/2002 | Boreczky et al. ............ 345/719 |
| 6,469,714 B2 * | 10/2002 | Buxton et al. ............ 345/762 |
| 6,522,342 B1 * | 2/2003 | Gagnon et al. ............ 345/716 |
| 6,535,228 B1 * | 3/2003 | Bandaru et al. ............ 345/752 |
| 6,578,025 B1 * | 6/2003 | Pollack et al. ............ 707/2 |
| 6,603,488 B2 * | 8/2003 | Humpleman et al. ............ 345/771 |
| 2001/0032151 A1 | 10/2001 | Paul et al. ............ 705/26 |
| 2001/0049671 A1 * | 12/2001 | Joerg ............ 706/50 |

* cited by examiner

*Primary Examiner*—Kristine Kincaid
*Assistant Examiner*—Peng Ke
(74) *Attorney, Agent, or Firm*—Fish & Neave IP Group Ropes & Gray LLP

(57) ABSTRACT

A customizable environment is disclosed including an interactive presentation having a plurality of object placeholders, each for holding a presentable object or a presentable reference to an object. Each placeholder has a selector for selecting the presentable object or reference held therein and a selector for selecting the placeholder. The customizable interface further includes a data store for storing the presentable objects. The presentable objects are linked to indicate the relationship between the objects whereby the arrangement of the presentable objects, references, or both within the placeholders corresponds at least in part to the manner in which the presented objects and references are linked.

35 Claims, 7 Drawing Sheets

CUSTOMIZABLE PRESENTATION ENVIRONMENT

CROSS REFERENCE

This application claims benefit of the provisional application 60/230,300 filed Sep. 6, 2000.

FIELD OF THE INVENTION

The invention relates generally to manipulating objects in a customizable environment and, more particularly, to the rearrangement of visual items on a display, such as a web page.

BACKGROUND OF THE INVENTION

The manner in which content or information is presented to a user has a considerable effect on the user's ability to efficiently process the outputted or presented content and/or interact with the presented user interface. In particular, the arrangement of the presented content or user interface affects the usability and/or processing of the presented data or content. Moreover, it is also advantageous to provide for customization of the presented content by the user so that the user can modify the placement of the presented content.

To better aid in the understanding of the inventive concept, the example of a customizable HTML-based photo album display page is given below.

Today, most web pages and web based applications are relatively static as compared to computer-based applications. In other words, a user is not typically able to alter web page content in any straightforward or easy manner. In fact, most web pages are intentionally unalterable. The only customization that is typically provided to an end user is the ability to add and delete visual items from a page. For example, many web-based photo album web pages exist today. However, users are typically only permitted to add new digital photos to the page, whereupon the photos are displayed in the order in which they were added. Typically, the user is also able to delete selected photos from the photo album web page, in which case the remaining photos are merely shifted to fill in the blanks created by the deleted photos.

Prior systems, such as DHTML and Javascript, allow a user to rearrange items on a page; however, none of the prior are systems store a persistent state of arrangement of the items or objects on the back end.

Thus, there exists a need for providing the user with a user-friendly and flexible way to modify the arrangement of presented content, such as digital photographs, in an interactive presentation, such as an HTML based web page.

SUMMARY OF THE INVENTION

A customizable environment is disclosed including an interactive presentation having a plurality of object placeholders, each for holding a presentable object or a presentable reference to an object. Each placeholder has a selector for selecting the presentable object or reference held therein and a selector for selecting the placeholder. The customizable interface further includes a data store for storing the presentable objects. A database may also be employed for storing the objects or references. The presentable objects may be digital pictures or icons. The presentable objects are linked to indicate the relationship between the objects whereby the arrangement of the presentable objects, references, or both within the placeholders corresponds at least in part to the manner in which the presented objects and references are linked. The environment may include a web server and the presentation could be part of a web page on the web server which is viewable over the global computer network. A means for selecting a last position of the interactive presentation can also be provided, and in one form of the invention the means for selecting the last interactive presentation position is a selection bar.

In one preferred form of the invention, the interactive presentation is an electronic interface. In another form the interface is selected from group consisting of visual displays, auditory displays, tactile displays, digital devices or agents, video display, web page, and combinations thereof. The interface can also be automatically adaptable as an input or output device.

In one form of the invention, the interactive presentation has at least one spatial dimension.

In one preferred embodiment of the invention the means for selecting the presentable object or reference held therein is a selection box and/or the means for selecting the placeholder is a selection bar. The selecting means may further comprise an aural, oral, visual, electrical, mechanical, optical, digital, or software selector.

In another preferred form of the invention, the presentable objects or references thereto are stored in a doubly-linked list. Also, each presentable object in the doubly-linked list could have a pointer that refers to each of the presentable objects adjacent thereto.

BRIEF DESCRIPTION OF THE DRAWINGS

For a more complete understanding of this invention, reference should now be made to the embodiment illustrated in greater detail in the accompanying drawing and described below. In the drawings.

DETAILED DESCRIPTION OF THE PREFERRED EMBODIMENT

Figure 1:
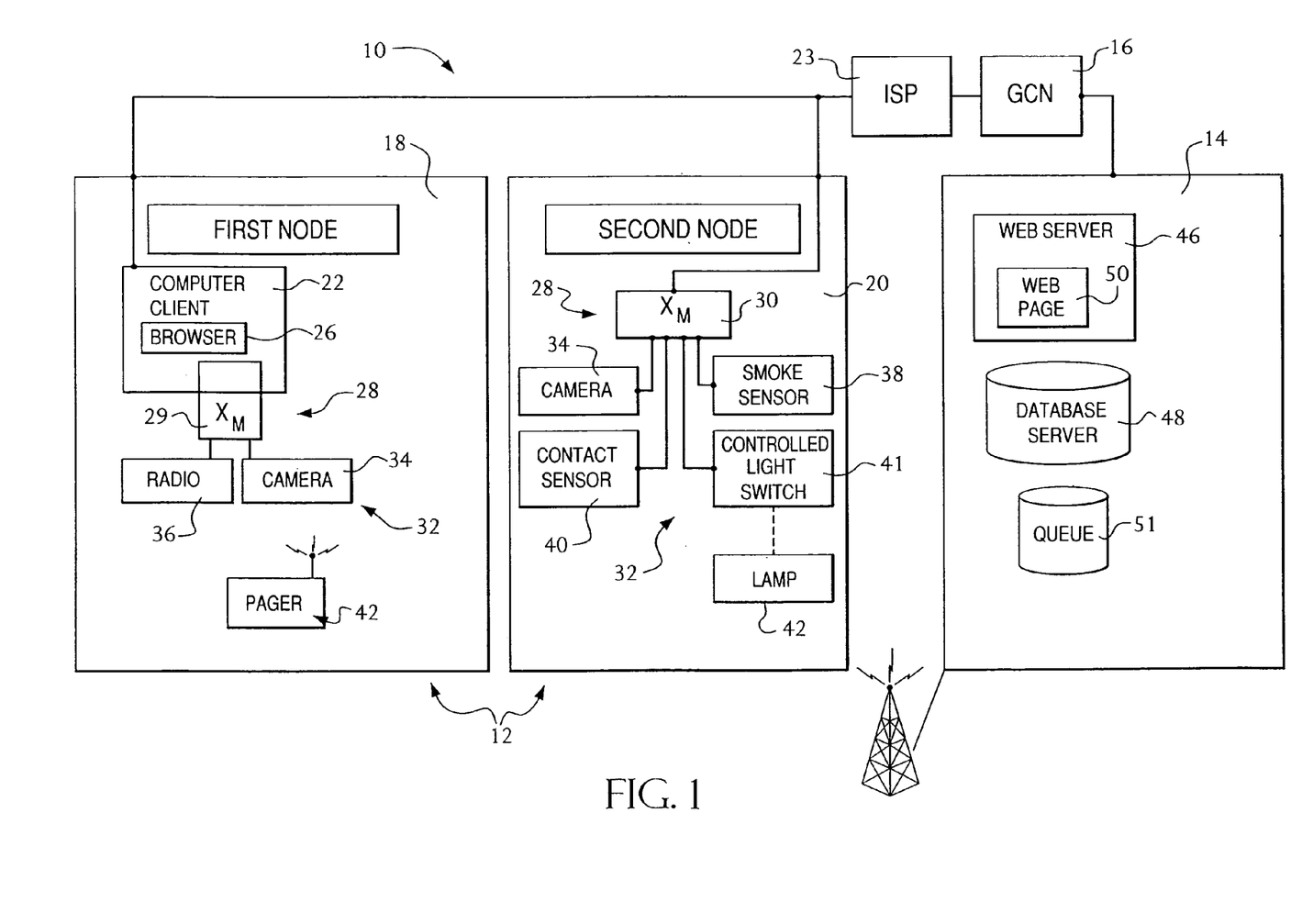
FIG. 1 is a schematic view of an embodiment of a client/server system in accordance with the present invention.

In FIG. 1 there is shown a system 200 for transferring data or commands from a data source or command generator to a service broker via a moderator. The moderator allows the service broker to get commands and/or data from the data source without needing the functionality of a server or otherwise some mechanism for listening for the data transmission.

The system 200 includes a data source or command generator 202 that initiates the transfer of commands and/or data intended for a particular service broker. Additional data sources/command generators 204, 206 may also be provided. The system 200 includes a service broker 208 that receives the data/commands from the data sources/command generators. In addition to service broker 208, the system may also include any number of additional service brokers 210, 212.

Each service broker may include connected devices 214, 216, 218, 220, 222. In one form of the invention, these connected devices are the ultimate receivers of at least some of the data commands transmitted from the data sources/command generators 202, 204, 206. The connected devices are described in greater detail in connection with the second preferred embodiment, but for purposes of the current invention are defined as any appliance or electronic equipment that can be communicated with remotely and are capable of being connected to the network.

Each data source/command generator may include a virtual representation of the service brokers and/or the connected devices. For example, as shown in FIG. 1, a virtual representation 224 for the service broker 208, along with virtual representations 226, 228, 230 for the connected devices 214, 216, 218 are present on the data source/command generator 202. It should be understood that the data sources could contain a virtual representation for any or all of the connected devices and service brokers, but have been omitted from FIG. 1 for the sake of clarity.

In addition, the additional data sources/command generators would also preferably include virtual representations of any of the service brokers and/or connected devices. For purposes of the present invention, the virtual representation is a control, group of controls, and/or user interface for a service broker or connected devices that is mapped to a representative control on the connected device and/or service broker.

Between the data sources and the service brokers is a moderator 232 that listens for and accepts data/commands transmitted from the data source/command generators. It should be understood that any number of additional moderators, such as moderators 234 and 236 can also be provided in the present system as necessary or required.

Each moderator includes a data store 238 for temporarily storing the data/commands received by the moderator. The preferred form of the data store is a queue of commands. Such a queue of commands can take any number of forms as known to those skilled in the art.

Each moderator also includes a communications module that functions as a forwarding agent 240 for forwarding data/commands residing on the data store 238 to the service brokers. Preferably, the forwarding agent 240 transmits its data synchronously or asynchronously pursuant to a request from the service broker. Of course, the forwarding agent may function in any suitable way to pass data as known to those skilled in the art.

Data is transferred between the data sources, moderators and service brokers via any suitable data transfer protocol. Preferably, data is transferred using the HTTP protocol between all the devices which are networked together via the global computer network, such as the Internet.

In addition, the data is transferred using name value pairs, with each piece of data being transferred as the value part and identified by the name part. For example, a command x intended for the service broker 208 can be encoded using the name value pair "service broker 208: connected device 214: command x." By transferring data using name value pairs, data can be easily transferred using the HTTP protocol.

In addition to transferring data using name/value pairs, data is preferably transferred using a field value abstraction layer that allows an unlimited number of name value pairs to be transferred.

The service broker 208 is capable of performing many different functions in order to effect the transfer of data. For purposes of the present invention, the different functionalities of the service broker 208 are described in terms of "modules." It should be understood that the "modules" could be implemented in software, hardware, or a combination of the two.

As best seen in FIG. 1a, the service broker 208 includes a first communication module 250 for initiating communication with the moderator 232 and is adapted to receive data from the moderator 232. In addition, the first communication module 250 is capable of handling a device identifier and/or class of device identifiers for each connected device and/or service broker. An example of which is given in connection with the command x as described above. The device identifier allows the first communication module to communicate with a particular device, whereas the class of identifiers allows the first communication with a class of similar or otherwise redacted devices.

The service broker 208 includes a second communication module 252 for sending data to the moderator 232 and/or the data source 202. The second communication module 252 is responsible for acknowledging the successful transmission of data to the service broker 208 and is also responsible for updating the virtual representations 224 of the service broker or the connected devices which may be present on the data source 202 and the moderator 232.

The service broker 208 also includes a service action module 254 for processing the data received from the moderator 232 and for performing a tasks based on the processed data. For example, the data source 202 might transmit a command to the service broker 208 via the moderator 232 which is a command for changing the state of one of the connected devices 214. The service broker 208, upon receiving the command, processes the command and passes a command to the connected device 214 in a form which it understands for changing the state of the device. Further examples of the functionality of the service action module 254 are described in connection with the second preferred embodiment which is described in greater detail below.

The service broker 208 also includes an export module 256 which is in communication with the service action module 254. The export module 256 is responsible for publishing data i.e., updates to the virtual representation to the data network and, in particular, to the data source 202 and the moderator 232. It is the export module 256 that is responsible for updating the virtual representation of the service broker and the connected devices and for synchronizing the virtual representation for these devices with the devices themselves. The export module 256 may utilize the services of the second communication module 252 to effect the publication of data.

In operation, data or commands intended for the service broker 208 are transmitted to the moderator 232 and stored a data queue 238. Periodically, the service broker 208 polls the data queue 238 for waiting data. If data is present in the data queue 238, the forwarding agent 240 functions to transfer that data to the service broker 208. The data is received by the first communication module 250 and processed by the service action module 254 and performs whatever task is associated with the received command. If necessary, the service broker 208 interfaces with the connected devices 214 if the transmitted command is intended for one of the connected devices. Once the command has been processed and the task performed, the export module 256 publishes an update based on this performed task back to the data source 202 so that the virtual representation 224 can be updated and synchronized. In this way, data is transferred between a data source 202 to another device, such as a service broker or connected devices, which is not otherwise directly accessible by the data source.

In FIGS. 2-6 there is illustrated a second preferred embodiment of the present invention. This second preferred embodiment is a specific implementation of the invention and concepts described in connection with the first embodiment. The second preferred embodiment is provided to illustrate how the invention can be implemented in a client/server environment over a global computer network having many distributed clients and a centralized server or moderator.

OVERVIEW OF SYSTEM ARCHITECTURE

Client-Side

Figure 2:
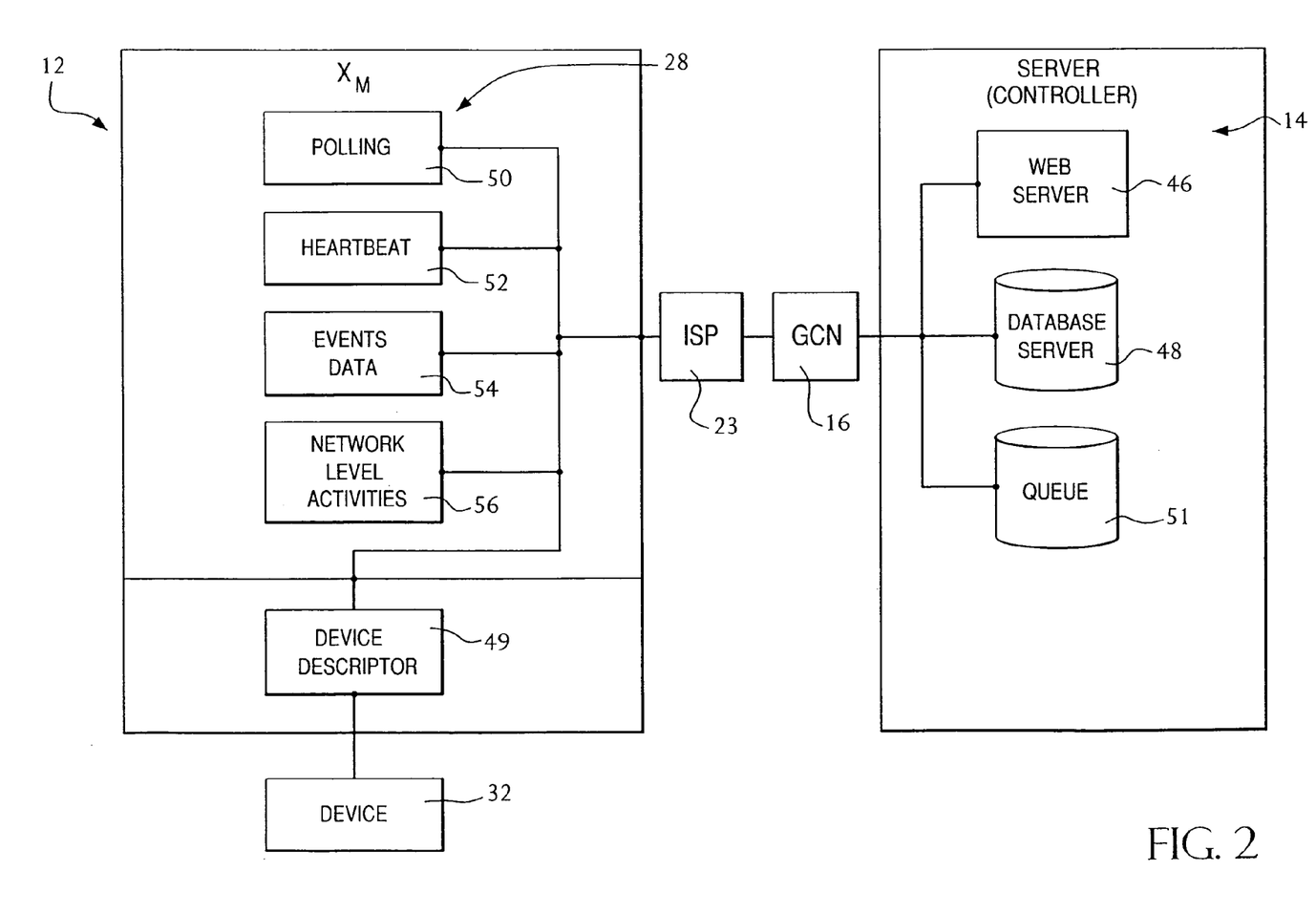
FIG. 2 is a schematic view of the client and server components of the system shown in FIG. 1.

In FIG. 2 there is shown a client and server system 10 in accordance with the present invention. The client/server system 10 includes a client 12 and a server 14 which are connected via a global computer network 16, such as the Internet.

The client 12 is operated by a local user (not shown). The client 12 may comprise a plurality of nodes, such as first user node 18 and second user node 20. It should be understood that the nodes 18 and 20 may be located at a single location, such as the user's house or at separate locations such as the user's main house and the user's vacation house. The present invention contemplates a plurality of local user locations and/or a plurality of remote user locations.

In one form of the invention, the user node 18 includes a client computer 22 that is connected to the global computer network 16 via an Internet Service Provider (ISP) 23 by any conventional means, such as a dial-up connection, DSL line, cable modem, satellite connection, or T1 line. The client computer 22 includes an Internet browser program 26 for accessing web pages via the global computer network 16.

A monitoring module 28 is also provided which serves as a gateway between the server 14 and at least one connected device 32. The monitoring module can take various forms, such as a software program 29 running on the client computer (as shown at node 18). Alternately, the monitoring module 28 can take the form of a stand-alone appliance 30 (as shown at node 20) which is connected to the global computer network 16 and operates separately and independently from the client computer 22. The monitoring module 28 is described in greater detail below.

At least one, and preferably a plurality of, device or appliance 32 is connected to and controlled by each monitoring module 28. The connection between the monitoring module 28 and the various devices 32 can be wired or wireless.

The appliances 32 encompass a multitude of devices which are capable of being controlled or mediated by an external controller. Such appliances include camera 34, radio 36, smoke or fire detector 38, contact sensor 40, and light switch 41. Although not illustrated, it should be understood that the present invention encompasses many other such devices such as various audio input and output devices, various visual displays, washers/driers, microwave ovens, cooking ranges, car alarms, plant watering devices, sprinkler, thermostats, carbon monoxide sensors, humidistats, rain gauges, video cassette recorders, radio tuners, and the like.

In addition, a myriad of notification devices, such as pager 42, can also be incorporated into the system. As best seen in FIG. 2, the pager 42 is in wireless communication with a wireless or cellular transmitter 44 associated with the server component 14. Other notification devices besides the pager 42 are also contemplated by the present invention including, e-mail clients, wireless hand-held computers, wireless wearable computer units, automatic web notification via dynamic web content, telephone clients, voice mail clients, cellular telephones, instant messaging clients, and the like.

Server-Side

The server 14 of the present invention includes a web server 46 and a database server 48. The web server 46 generates static web pages and dynamic web pages from data contained in the database server 48. The web pages 50 can be viewed by the user on the Internet browser 26 running on the client computer 22.

It is contemplated that the client 12 and the server 14 communicate over the global computer network 16 via the conventionally available TCP/IP environment using the HTTP protocol. Of course, it should be understood that any request-response type of protocol and socket-based packet transport environment would also be suitable and within the scope of the contemplated invention.

It is also contemplated that the server 14 of the present invention functions as the master controller of the system 10. In addition, the client-server configuration of the system 10 and the connection of the system 10 to the global computer network 16 via an ISP 23 allow a user to access the system 10 via any computer, monitoring appliance or similar device connected to the global computer network 16.

In this way a user is able to control and monitor a plurality of devices 32 connected to the monitoring module 29 at node 18 and a plurality of devices 32 connected to the networked monitoring module 30 at node 20. The devices 32 can be accessed via any personal computer 22 by accessing the control server 14 via the global computer network 16. By using a global computer network 16 it should be clear that a user, or anyone the user permits access to, can readily monitor and control the monitoring modules 28 at nodes 18 and 20, from any location, using any suitable device that has access to the global computer network 16.

The Monitoring Module

Figure 3:
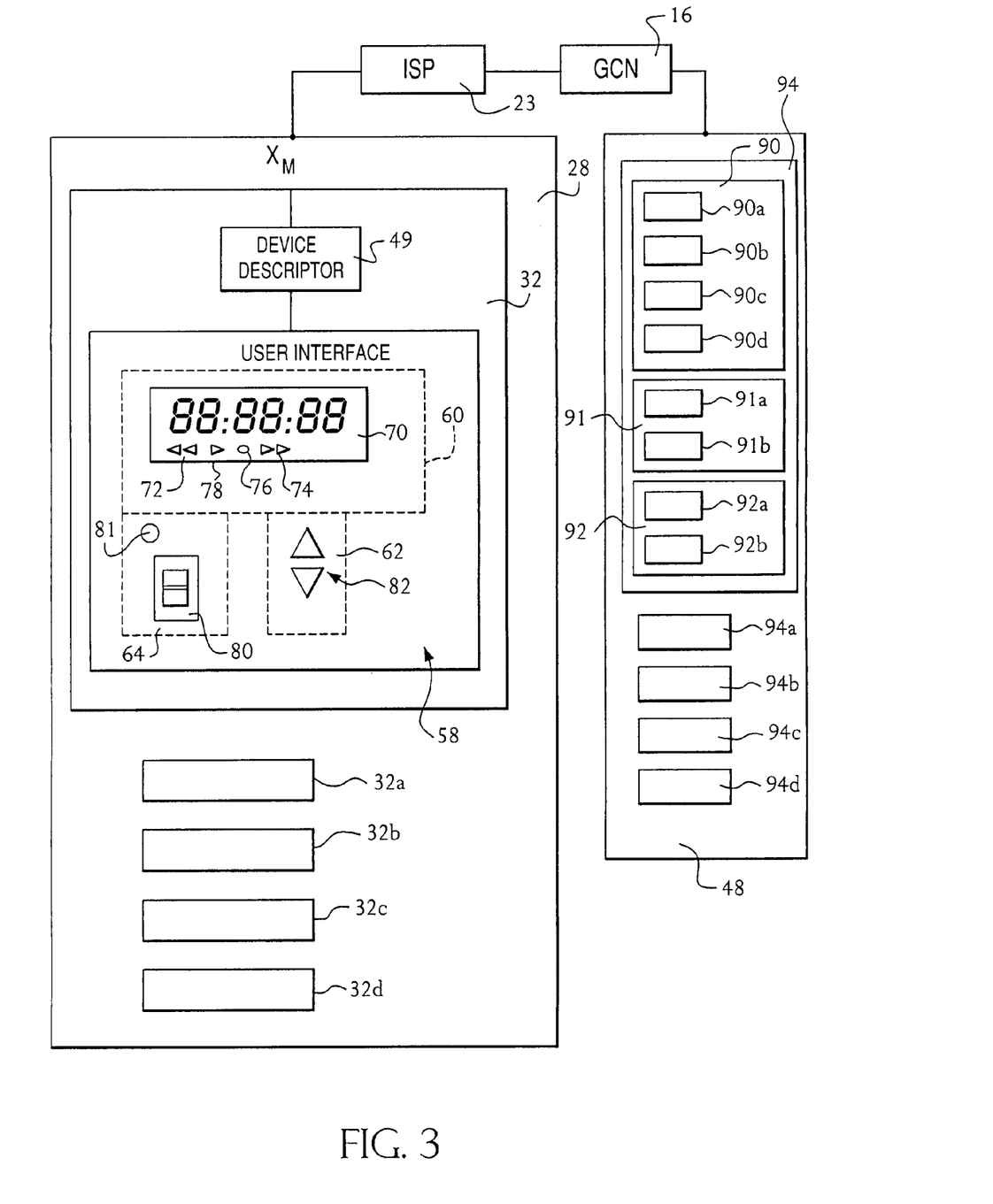
FIG. 3 is a schematic view of the controlled devices and virtual representation of same in the server data base of the system shown in FIG. 1.

Referring now to FIG. 3, the monitoring module 28 serves as the connection hub for the controlled devices 32 and as the gateway for brokering communications between the devices 32 and the control server 14 via the global computer network 16.

One of the functions of the monitoring module 28 is to serve as a translation and brokering agent between the server 14 and the connected devices 32. In its software form 29, the monitoring module 28 comprises a plurality of dynamically loaded objects, or device descriptors 49 that allow the server 14 to interface with the connected devices 32. The dynamically loaded device descriptors 49 act as the device drivers for the connected devices 32, translating, in both directions, the monitoring, command, and control data that is sent and received between the monitoring module 28 and the server 14 via the global computer network 16. Each device descriptor 49 also translates the signals received from the monitoring module 28 into the specific electrical signals that are required to communicate with, both input and output, and control its associated device 32. In addition, because each device 32 has its own specific interface and requires a specific set of electrical signals to monitor and control it, a different device descriptor 49 must be provided for each specific model of each device 32.

The monitoring module 28 also controls the communication between the server 14 and the connected devices 32 via the global computer network 16. The HTTP protocol employed by the existing global computer network is a stateless protocol. Since the knowledge of the current state of the connected devices is vital to the successful operation of the system 10, it is necessary for the monitoring module 28 to store the persistent state of the connected devices 32 and to provide a system for periodically updating and obtaining the state of each connected device 32 and for obtaining commands from the server 14. The monitoring module 28 does this by polling 50 the server 14 and maintaining a system heartbeat 52.

The monitoring module 28 polls 50 by scheduling a transmission between the monitoring module 28 and the server 14 in which it checks for commands from the server 14. If commands are waiting on the server 14, the server will return commands in an algorithmic manner, that can take various forms, for processing and also informs the monitoring module that N commands are waiting in the queue. The monitoring module 14 will then poll the server 14 and retrieve data from the server 14 until there are no more commands in the queue. In this way, commands from the server 14 can be delivered to the monitoring module 28 to effect changes in the devices 32 over the stateless medium of the existing global computer network 16.

In a typical polling operation 50, the client computer 22 issues a command for incurring a change in state of one of the control devices 32. The change in state command is posted to a data store 51, such as a command queue associated with the server 14. Similarly, if the server 14 desires to make an internal change to the monitor 28, such as setting or modifying the polling 50 or heartbeat 52 time intervals, these commands are likewise posted to the storage device 51. Upon reaching the end of the current polling interval, the monitoring module 28 sends a transmission to the server 14, requesting any queued commands. The monitoring module 28 continues to poll, using a preselected transmission scheme, until the queue of commands waiting for the monitor 28 is complete. Each command received from the queue is acted upon when it is received and any associated state changes are effected. The server 14 transmits an acknowledgment of receipt and successful processing of the data back to the monitoring module 28.

The monitoring module 28 is also responsible for maintaining a heartbeat 52 or a scheduled periodic update regime to refresh the current state of the devices 32 stored in the database server 48. The primary function of the heartbeat 52 is to synchronize the states of the devices 32 and the virtual representation of those devices stored on the server 14. The heartbeat 52 also functions to send device events and state changes between the devices 32 and the server 14 to effect this synchronization of the control server 14 and to assure that the monitoring module 28 and the server 14 are synchronized.

Not only is the monitoring module able to send commands to the server 14, but the server 14 is able to send commands back to the monitoring module 28. The types of transmissions that cause the server 14 to send unsolicited transmissions back to the monitoring module 28 are to set or update the heartbeat or polling time and to issue a command to update a component of a device.

In a typical heartbeat operation 52, the monitoring module 28 sends a transmission to the server 14 in response to a change in state of a connected device 32, a synchronization of a control device 32 with server 14, a triggered alert event, or the like. In such a heartbeat operation 52, all data intended to be transmitted to the server 14 is transmitted to the server 14 via the global computer network. The server 14 transmits an acknowledgment of receipt and successful processing of the data back to the monitoring module 28.

Along with maintaining the polling and heartbeat operations and sending and receiving events, data, and commands 54 to and from the server 14, the monitoring module 28 also takes care of many network level activities 56 such as verifying passwords, dialing up the ISP if necessary, periodically uploading accounting/billing information, and performing security measures.

Another function of the monitoring module 28 is the storage of the persistent state of the devices 32. In the event that the user's computer 22 crashes and the monitoring module 28 must be restarted, many of the parameters that were negotiated between the monitoring module 28 and the server 14 during the registration process are stored in the memory of the monitoring module.

Device Interface and Descriptors

Figure 4:
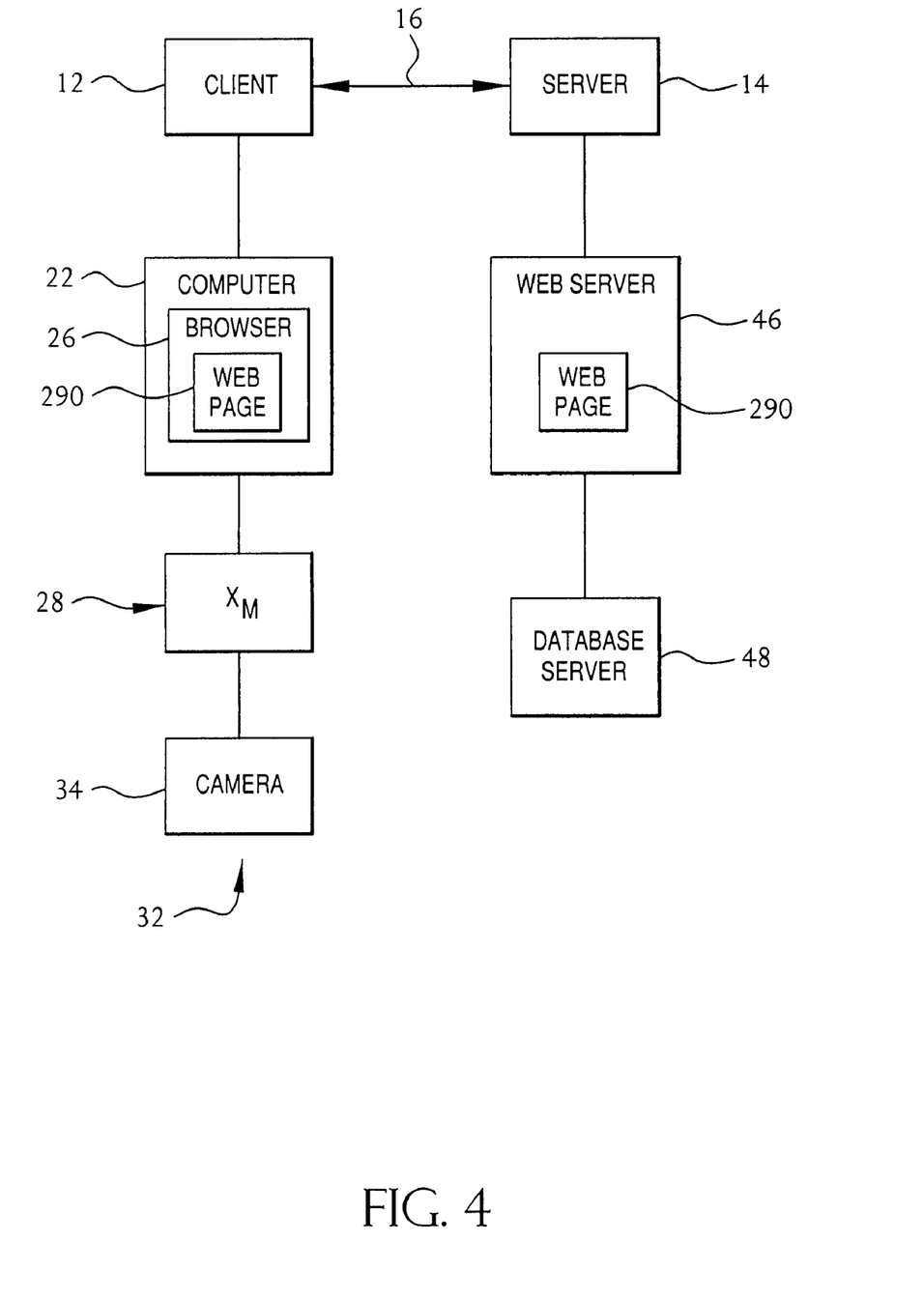
FIG. 4 is a schematic representation of a client/server system in accordance with the present invention.

Referring now to FIG. 4, a series of devices 32, 32a, 32b, 32c, 32d is shown. Each device is connected to a monitoring module 28 via a device descriptor or driver 49 (only one shown). Each device may include a customizable user interface 58 that is viewable on the client computer 22 over the global computer network 16 through a virtual representation of the user interface stored on the web server 46, as explained below. The user interface 58 comprises at least one resource or sub-devices 60, 62, and 64. Typically, a resource provides a specific functionality of the device. For example, the device shown in FIG. 4 represents a VCR having a recording setting resource 60, a channel selecting resource 62, and a power selecting resource 64. Of course, a typical VCR would have many other operational resources, but the resources illustrated are sufficient to describe the basic operation of the device.

Each resource 60, 62, 64 is made up of components or the basic building blocks of the user interface 58 of the device. For example, the recording setting resource 60 comprises a display component 70 and a series of pushbuttons 72, 74, 76, 78 which activate the VCR's fast forward, reverse, play, and stop functions, respectively. The channel selecting resource 62 comprises the display component 70 and a pair of pushbuttons 82 which activate the up channel and down channel functions of the VCR. The power selecting resource 64 comprises a toggle switch 80 for activating the VCR's power on and power off commands and an LED indicator 81 which indicates the power condition of the VCR.

A virtual representation of each device 32, 32a, 32b, 32c, 32d also exists as a record 94, 94a, 94b, 94c, 94d in the database server 48 of the control server 14. Each record contains an entry for each resource and its associated components which make up the device. For example, The record 94 for the VCR device 32 contains an entry 90, 91, 92 for each resource 60, 62, 64 and an entry 90a, 90b, 90c, 90d, 91a, 91b, 92a, 92b for each component 70, 72, 72, 74, 80, 81, 82, respectively. In addition, a web page 50 can be generated by the web server 46 by extracting the associated record for that device from the database server 48 and creating a graphical, textual, tactile, aural, or other similar modality user interface representation of that device which a user can access via the Internet browser 26.

Basic Operation of the System

In operation, the client 12 first registers with the server component 14 to begin using the services offered therein by accessing the web server 46 of the server component 14 via the client browser 26. At this point, an account is opened for the client 12 and the user's information is stored in the database server 48. If it has not been previously registered, the monitoring modules 29 and 30 would also be registered with the server component 14 and their information would also be stored in the database server 48 and associated with the node 18. Once the monitoring modules 29 and 30 have been registered, any device 32 that is attached to either of the monitoring devices 29 and 30 would also be registered in the system, stored in the database server 48, and available to the user. Each device 32 communicates with the monitoring modules 29, 30 and either exports its interface to the database server 48 or otherwise obtains a default interface configuration, as explained in greater detail below. These interfaces, as described in greater detail below, are adapted to be displayed, to be viewed, and to be interacted with by the user via the client browser 26 over the global computer network 16 by accessing the web server 46.

A few uses of the present system 10 will now be explained to aid in the understanding of the operation. For example, the contact sensor 40 could be associated with the front door (not shown) at the remote location 20 and set to trip whenever the front door is opened. The camera 34 is also positioned to view the front door location and can be programmed to take a digital photograph whenever the sensor contact 40 is tripped and transmit that photograph to be stored in the database server 48. When, in fact, the contact sensor 40 detects that the front door has been opened, an event notification or alarm trigger is transmitted by the monitoring module 30 to the database server 48 which has been previously programmed to transmit a notification event to the user's pager via the cellular transmitter 44. As the contact sensor is tripped, the camera 34 takes a picture of the front door and transmits that picture via the monitoring module 30 via the global computer network 16 to the database server 48. The user, having been notified via the pager 42, can now access the web server 46 of the server component 14 via his Internet browser 26 to retrieve the photograph that has been stored on a database server 48. In this way, the user can determine whether an intruder has entered via the front door of his vacation home or whether his family has just arrived for their vacation.

Another use for the system 10 would be for the user located at the node 18 to be able to control his lamp 42 at his vacation home located at node 20. The user would contact the web server 46 via his Internet browser 26 to access the database entry of the light switch 41. A virtual representation of the light switch 41 would be available on the web server 46 and could be manipulated by the user to remotely change the state of the light switch 41 and the connected lamp 46, say from being "off" to being "on." To do this, the user would simply manipulate the on/off virtual representation of the light switch on the web server 46 and this command would be placed in a queue of waiting commands on the server component.

Periodically, the controlling module or monitor 30 polls the server component 14 looking for waiting commands, such as the change state command of the light switch 41. Thereafter, the command would be transmitted to the monitoring device 30 which would instruct the light switch to change from the "off" state to "on" state, and, thus, turning on the lamp 46. This change in state of the lamp 46 could be viewed by an appropriately positioned camera, such as camera 34, which would be used to visually monitor the remote location 20 to determine whether the command had been completed successfully.

One of the advantages of the present system is the ability to take data generated from the connected devices 32 and transmit it via the global computer network 16 to the server 14 whereupon it can be displayed in a web page served up by the web server 46. For example, a user could take digital photographs on a digital camera connected to the system of the present invention and transmit those digital photographs via the global computer network to the server. Once the photographs are on the server, anyone having access to the global computer network could view the photographs.

It should be understood that any type of object or content that is presentable on a web page such as a GIF or JPEG file, a text file, a digital video file, an audio file, or the like would fall within the scope of the present invention. It should also be understood that the presented objects can be thumbnails or compressed versions of digital pictures, the first key frame of a video, an audio icon, or the like that is a reference or is otherwise hyperlinked to the actual full-sized version of the object. In addition, when the presentation is not in the digital domain, the presented object can be virtually any object that can be arranged or manipulated.

To aid in the understanding one preferred embodiment of the present invention relating to the customizable environment, a subset of the client/server system 10 is shown in FIG. 4.

A client 12 is connected to a server 14 via the global computer network 16. The client 12 also includes a computer 22 that is networked to the global computer network 16 and has a web browser 26 for displaying web pages 290. A connected device 32, such as a digital camera 34, is connected to the client 12 via a service broker 28, as described in greater detail above.

The server 14 includes a web server 46 and a database server 48. The web server 46 serves up web pages 290 over the global computer network 16 which are viewable in the client browser 26.

A user utilizing the system depicted in FIG. 4 could take digital photographs with the camera 34. These digitized photographs are transmitted over the global computer network 16 to the server 14 where they are stored. The digital photographs or other objects are stored in any suitable temporary or permanent storage device associated with the server 14, such as disk drive 15. The file name, file type, and directory where the file is stored is stored in the database 48. This information is accessed and the information gathered is utilized to retrieve the particular object to be displayed.

A user wishing to view the photographs on the server 14 could use their Internet browser 26 to access a customizable environment 290, such as a HTML-based web page on the web server 46 that contain these photographs. The web pages are generated by accessing the information contained in the database 48 relating to the digital photographs to retrieve the digital photographs from the disk drive 15 and generate a web page for displaying the photographs. The manner in which the objects are arranged or displayed is within the knowledge of those skilled in art.

Figure 5:
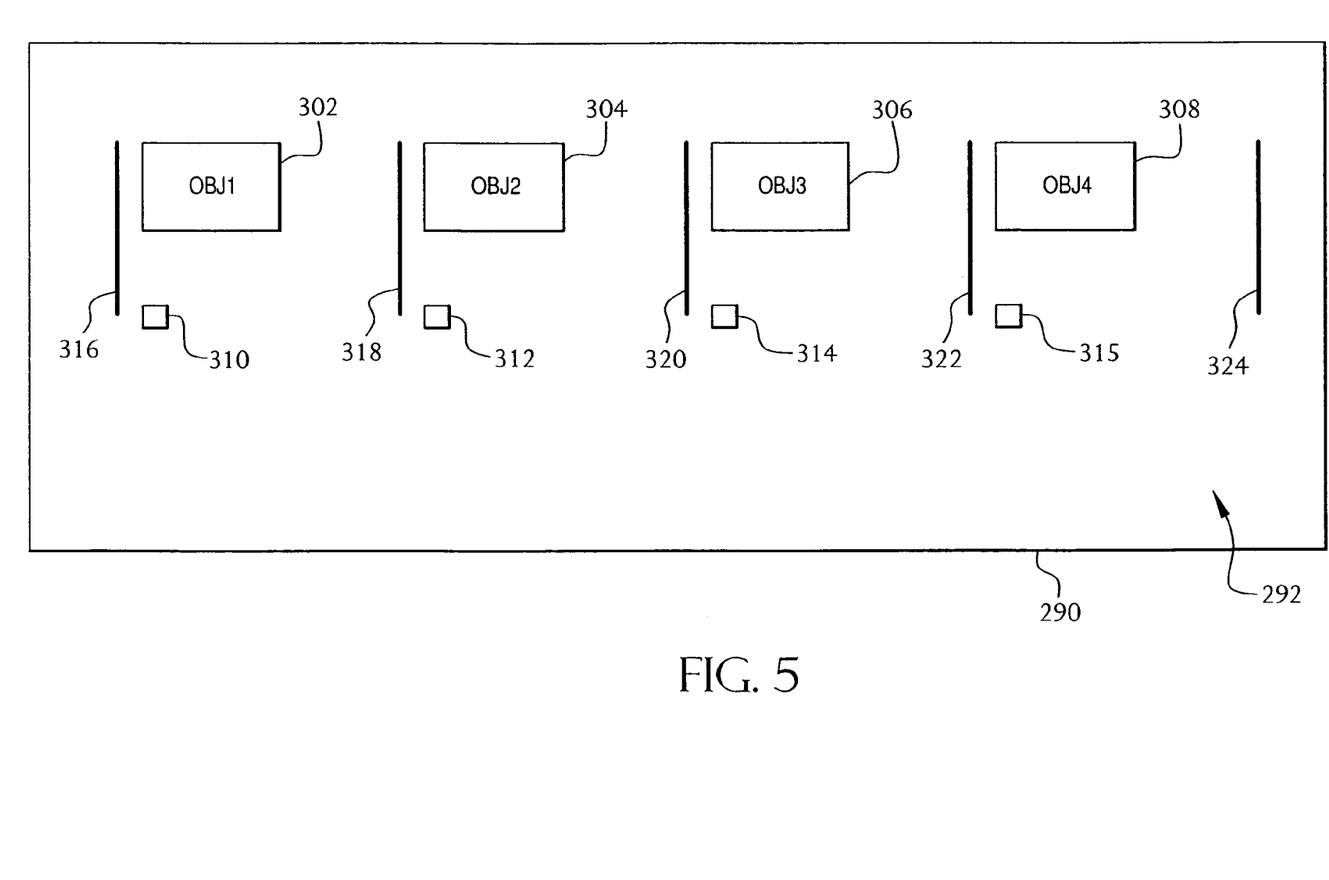
FIG. 5 is a schematic view of an interactive presentation containing customizable content in accordance with the present invention.

One such customizable environment 290 is shown in FIG. 5. In FIG. 5 there is depicted an interactive presentation 292 in the form of display or virtual photo album containing a plurality of placeholders 301, 303, 305, 307 for holding presentable objects, such as photographs 302, 304, 306, 308, respectively.

Although the preferred embodiment of the customizable environment having an interactive presentation has been described as a web page having a photo album displaying portion, it should be understood that other suitable customizable environments with interactive presentations include any one, two, three, and four dimensional presentations; and any visual, aural, and tactile presentations or the like. In other words, it is contemplated that the interactive presentation addition could be virtually any suitable output device. In addition, the interactive presentation of the present invention can also be an input device that has presentable objects or controls, such as a graphical user interface or the like.

Some examples of a one dimensional interface includes a vertical list of items on a web page or an aural interface comprising a linear set of spoken phrases, each representing a specific entity. For example, this one dimensional list could be a list of pictures which is randomly ordered which can then be rearranged alphabetically or to some other user selected criteria.

This may be accomplished by direct manipulation of the picture targets and the object placeholders. Some examples of a two dimensional interface presentation include a grid layout of items on a video screen; for an aural interface, an alphabetized listing of sound files with each alphabetized entry being in a row corresponding to the first letter of the key word alphabetized on; and, for an input-type example, an arrangement of chairs arranged in a two-dimensional pattern in a room. In this adaptation, for example a camera preferably may pivot about an x-y axis. The user interface may show the fixed focal point of the camera which the user may manipulate by altering the direction which the camera is pointed. Additionally, there may be a plurality of cameras which are directed into a given physical space. Each camera will track an x-y axis sweep, the points of which may overlap with the x-y axis sweep of another camera. The user may select views and then arrange them on a web page or some other representation of the physical space.

An example of a three dimensional interface/presentation includes a grouping of web pages linked together, perhaps with a large listing of search results broken down to ten items on each page. An example of a four dimensional interface/display includes the concept of time stored in a three dimension memory array with each instance of time in the memory representing a placeholder. For example, a user may query the arrangement of a particular environment at a given past time with respect to the current arrangement. In another exemplary embodiment the customizable environment could take the form of a virtual representation of a physical space such a conference room in which various types of sensors may be present. In this instance the interface will have shared characteristics of an input device and an output device. For example, in the room there may be various sensors which can track the physical movement of individuals throughout the room. Such sensors will be able to determine the number of individuals, their physical locations including their relative change in height as they move from a standing to a seated position and will be able to temporarily track a given individual's movement history throughout the room. This adaptation may have significant application in a security monitoring context that the event history for a given space can be monitored in real time or replayed for review at a later time. Additionally, other sensors such as heat, pressure, sound recording of the digital signal processing device may be employed to allow a user to query such discrete events such as for example the number of times a given chair within a room as sat on, or when certain words uttered and from which person those words were said.

In one preferred embodiment, the interactive presentation is a video display having a plurality of placeholders for storing content, such as digital photographs, sound samples, movement history or other indices which may be monitored digitally or by analog means.

The display placeholders 301 includes an associated item selector box 310 for selecting the object held therein and an associated destination bar 316 for selecting the placeholder 301 itself. Similarly, placeholders 303, 305, 307 have associated item selector boxes 312, 314, 315 respectively, and associated destination bars 318, 320, 322. In addition, an extra destination bar 324 is provided after the last position 307 for selecting the last position. It should be understood that the selecting means for selecting the content or placeholder contemplates many different suitable selectors such as, an audio or spoken command, a hand gesture, a hyperlink, a physical movement, an optical, mechanical, electrical, or aural scanner, sensor, or selector, a digital selector or agent that takes action on behalf of a user, or the like.

In the case of a software agent, the agent could be a computer program that monitors the placeholders and retrieves the objects from the database. When a selection is made by the user, the agent intercepts the input and selects and manipulates the arrangement of the objects and otherwise affects the corresponding change in the database on the back-end.

In the preferred embodiment, a user would use his mouse or other pointing device to select one of the photographs 302, 304, 306, 308 by selecting its appropriate hyperlinked selection box or 310, 312, 314, 315 respectively. The hyperlinked destination bars indicate the display position on the web page 290. For example, destination bar 316 represents the top left-most position, while destination bar 318 indicates the top right-most position.

In order to change the position of a particular object, the user first selects the item selector box of the object he wishes to move, and then selects the destination bar associated with the placeholder in which he would like that object to be placed. For example, if the user wanted to take photograph 308 and place it between photographs 304 and 306, the user would select selection box 315 and then select destination bar 316. An algorithm takes, as an input, the selected selection box 315 and the selected destination bar 316 and rearranges the content items displayed on the web page 290. The last destination bar 324 is provided for the user to move an object to the end of the object list or web page display position.

Figure 6:
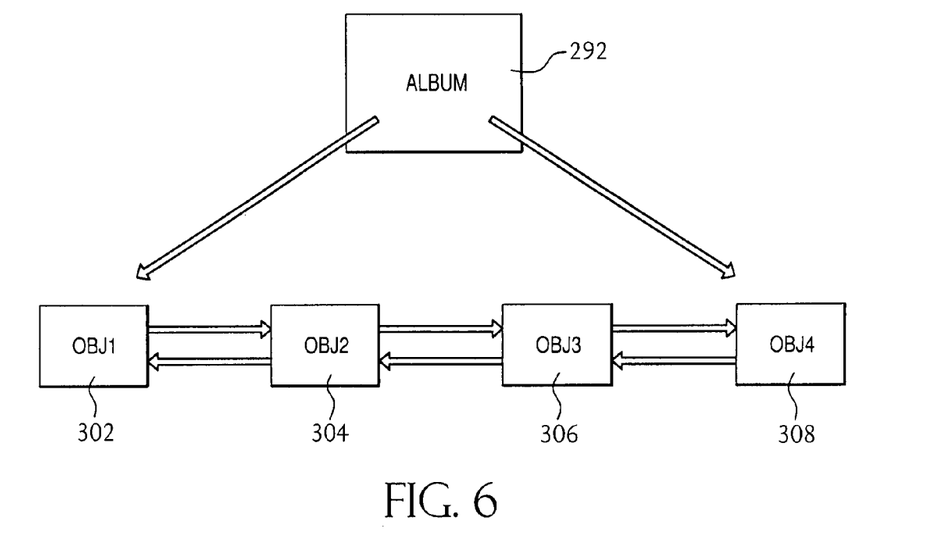
FIG. 6 is a schematic representation of the doubly-linked list of content items in accordance with the present invention in a first arrangement.

In FIG. 6, there is depicted a database representation of the doubly-linked list of items contained by the presentation of those objects, such as the photo album 290. The arrangement shown in FIG. 6 corresponds to the arrangement displayed in FIG. 5. As such, object 302 is shown linked to adjacent object 304. Object 304 is shown linked to adjacent object 302 and also to adjacent object 306. Similarly, object 306 is shown linked to adjacent object 304 and adjacent object 308. Lastly, object 308 is linked to adjacent object 306.

The order of the objects displayed on the web page 290 is not limited by the order in which they are stored in the data store. The objects can be ordered by any suitable method, such as alphabetically, by date and time, by type, or the like. By storing the link structure of the ordering of the objects in a central database, any number of users may have access to the ordered objects. Moreover, one user may be able to rearrange the objects, while the other users can only view the arrangement of the objects.

Preferably, the objects are stored in doubly-linked list, i.e., each object has a pointed to each of its neighbors. It should be understood that the objects could also be stored in an array or the like. The primary advantage of storing the object in a doubly-linked list is because there is no need to modify any of the indices when a new object is inserted into the middle of the list or the list is rearranged, such is the case in an array implementation.

In order to move an object, the user selects both the object to be moved and also the destination position. For example, if a user wanted to move photograph 306 to be between the first photograph 302 and the second photograph 304, the user would select selector box 314 and destination bar 318 to effect the change.

Using the doubly-linked list, since the objects adjacent to the position in which the photograph is intended to be moved is known, the object can be moved without disturbing any of the other objects, except the adjacent objects. For example, if photograph 306 was moved to be between placeholder 302 and placeholder 304, only the photographs 302 and 304 would need to be modified. In this way, the destination placeholder of the moved object can be thought of as a placeholder next to or between two other placeholders. A placeholder is associated with the objects to the left (or next) and to the right (or previous) of a moved object. Therefore, when the user selects a placeholder, the algorithm translates that selection to be the next and previous objects adjacent to that placeholder.

Figure 7:
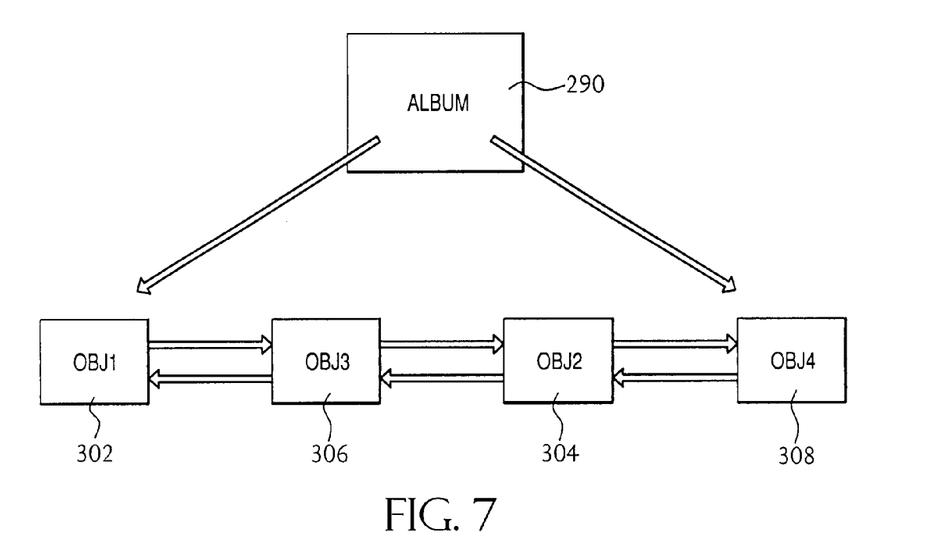
FIG. 7 is a schematic representation of the doubly-linked list of content items in a second rearranged position.
Figure 8A:
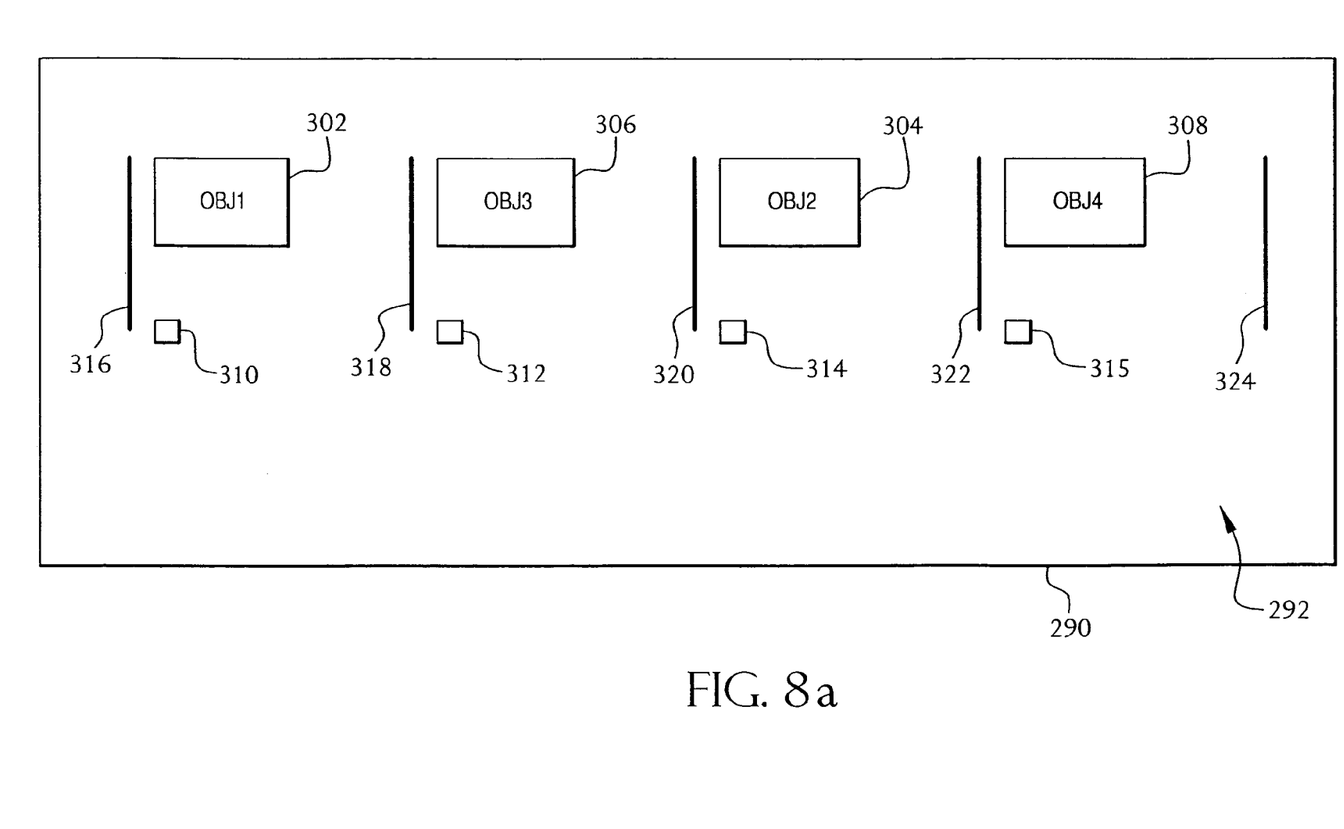
FIG. 8a is a schematic representation of the setting content options.

To move an object, it is first removed from its current placeholder in the doubly-linked list by changing the pointers of its next and previous neighbors. As best seen in FIG. 7, object 306 is being moved from between objects 304 and 308. In order to effect a change, the right hand pointer for object 304 is changed to point to object 308, while the left hand pointer for object 308 is changed to point to object 304. This change is shown in FIG. 7a. The moved object 306 is moved to its new location by changing the pointer of the left destination object to point to the moved object and the pointer of the right destination object to point to the moved object. Referring now to FIG. 7b, the object 306 is intended to be inserted between the objects 302 and 304. To effect this change, the right hand pointer of object 302 is changed to refer to object 306, while the left hand pointer to object 304 is changed to point to the object 306 also. This is shown in FIG. 7c.

Finally, to complete the change in position, the pointers of the moved object are changed to refer to its adjacent neighbors. Referring now to FIG. 7c, the pointers of object 306 are changed to point to adjacent object 302 and 304.

Once the change is completed, the rearranged database representation of the list of content items is shown in FIG. 7d. In FIG. 7d, content item 302 is now linked to content item 306. Content item 306 is doubly-linked to content item 302 and 304. Content item 304 is doubly-linked to content items 304 and 308. Content item 308 is linked to content item 304. Such an arrangement would switch the placement of content items 304 and 306 in the web page 290.

In one preferred embodiment, the presentation may be manipulated by a single user with so called "authoring privileges". In this regard, that user will be the only one permitted to change or alter the environment so that subsequent viewers of the environment will be presented with the arrangement selected by the individual with those authoring privileges. In this example, an author may choose selected views of particular objects such as photographic images. Authoring privileges fix those views so that subsequent viewers of the environment will encounter only the customized arrangement of that author. In one alternate preferred embodiment, subsequent viewers may have "pseudo authoring privileges" which will permit them to alter the apparent arrangement or view of the data on their interface or display. In this embodiment, a subsequent user who has "pseudo authoring privileges" will be permitted to arrange the objects on that user's interface (either transiently or in a fixed state) without actually changing any of the object linkages that actual author may have designated on the author's environment.

While certain preferred embodiments in various modifications thereto have been described or suggested, other changes in these preferred embodiments will occur to those of ordinary skilled in the art which do not depart from the broad inventive concepts of the present invention. Accordingly, reference should be made to the appended claims rather than the specific embodiment of the foregoing specification to ascertain the full scope of the present invention.

What is claimed is:

1. A customizable presentation environment of a service broker system for interactive monitoring and control of data to and from computers and/or Internet enabled devices of a client/server safety system over the Internet, the environment comprising:

an interactive presentation of data from a client-side of the system having a plurality of object placeholders, each for holding a presentable object or a presentable reference to an object, wherein the presentable object is a digital image obtained from a camera at a remote location in response to a sensor sensing a change at the remote location;

each placeholder having a resource for selecting the presentable object or reference held therein and a resource for selecting the placeholder; and a data store on the server-side of the system for storing the presentable objects from the client-side, the presentable objects being linked to indicate the relationship between the objects, each object having a pointer that refers to each of the presentable objects adjacent thereto, wherein the viewable arrangement of the presentable objects displayed on a presentable environment over the Internet is based on the manner in which the presentable objects are linked;

wherein the arrangement of the presentable objects, references, or both within the placeholders corresponds at least in part to the manner in which the presented objects and references are linked on the client-side of the system.

2. The environment set forth in claim 1, wherein the interactive presentation is an electronic interface.

3. The environment set forth in claim 2, wherein the interface is selected from a group of visual displays, auditory displays, tactile displays, digital devices or agents, and combinations thereof.

4. The environment set forth in claim 1, wherein the interactive presentation is an output device.

5. The environment set forth in claim 1, wherein the interactive presentation is an input device.

6. The environment set forth in claim 1, wherein the interface is automatically adaptable as an input or output device.

7. The environment set forth in claim 1, wherein the interactive presentation has at least one spatial dimension.

8. The environment set forth in claim 1, wherein the interactive presentation is a video display.

9. The environment set forth in claim 8, wherein the video display is a web page.

10. The environment set forth in claim 1, wherein the presentable objects are digital pictures or icons.

11. The environment set forth in claim 1, wherein the resource for selecting the presentable object or reference held therein is a selection box.

12. The environment set forth in claim 1, wherein the resource for selecting the placeholder is a selection bar.

13. The environment set forth in claim 1, further comprising a database for storing the links between references or objects.

14. The environment set forth in claim 1, wherein the links between presentable objects are stored in a doubly linked list.

15. The environment set forth in claim 2, wherein the presentable environment is viewable over the Internet.

16. The environment set forth in claim 15, further comprising a web server and wherein the display is part of a web page on the web server.

17. The environment set forth in claim 1, further comprising a resource for selecting a last position of the interactive presentation.

18. The environment set forth in claim 17, wherein the resource for selecting the last interactive presentation position is a selection bar.

19. The environment set forth in claim 1, wherein the selecting resource comprises an aural, oral, visual, electrical, mechanical, optical, or digital selector.

20. The environment set forth in claim 8, wherein the video display is a web page.

21. The environment set forth in claim 20, wherein the presentable objects are stored in a doubly-linked list.

22. The environment set forth in claim 21, wherein the presentable environment is viewable over the Internet.

23. The environment set forth in claim 22, further comprising a web server and wherein the display is part of a web page on the web server.

24. The environment set forth in claim 23, further comprising a resource for selecting a last portion of the interactive presentation.

25. The environment set forth in claim 24, wherein the resource for selecting the last interactive presentation position is a selection bar.

26. The environment set forth in claim 25, wherein the selecting resource comprises an aural, oral, visual, electrical, mechanical, optical, or digital selector.

27. The environment set forth in claim 20, wherein the resource for selecting the presentable object or reference held therein is a selection box.

28. The environment set forth in claim 20, wherein the resource for selecting the placeholder is a selection bar.

29. The environment set forth in claim 27, wherein the selecting resource comprises an aural, oral, visual, electrical, mechanical, optical, or digital selector.

30. The environment set forth in claim 28, wherein the selecting resource comprises an aural, oral, visual, electrical, mechanical, optical, or digital selector.

31. The environment set forth in claim 20, wherein the interactive presentation is an output device.

32. The environment set forth in claim 20, wherein the interactive presentation is an input device.

33. The environment set forth in claim 20, wherein the interactive presentation is an electronic interface and wherein the interface is automatically adaptable as an input or output device.

34. The environment set forth in claim 20, wherein the interactive presentation has at least one spatial dimension.

35. A customizable presentation environment of a service broker system for interactive monitoring and control of data to and from computers and/or Internet enabled devices of a client/server system for safety applications over the Internet, the environment comprising:

an interactive presentation of data from a client-side of the system having a plurality of object placeholders, each for holding a presentable object or a presentable reference to an object, the interactive presentation being a video display of a web page and the presentable objects being digital pictures or icons obtained from a camera at a remote location in response to a sensor sensing a change at the remote location;

each placeholder having a resource for selecting the presentable object or reference held therein and a resource for selecting the placeholder, the resource for selecting the presentable object or reference being a selection box and comprising an aural, oral, visual, electrical, mechanical, optical, or digital selector, and the resource for selecting the place holder being a selection bar and comprising an aural, oral, visual, electrical, mechanical, optical, or digital selector;

a data store on the server-side of the system for storing the presentable objects from the client-side, the presentable objects being linked to indicate the relationship between the objects and stored in a doubly-linked list, each object having a pointer that refers to each of the presentable objects adjacent thereto, wherein the arrangement of the presentable objects, references, or both within the placeholders corresponds at least in part to the manner in which the presented objects and references are linked on the client-side of the system, and the presentable environment is viewable over the Internet;

a web server wherein the display is part of a web page on the server; and a resource for selecting a last portion of the interactive presentation, the resource being a selection bar and comprising an aural, oral, visual, electrical, mechanical, optical, or digital selector.

* * * * *

UNITED STATES PATENT AND TRADEMARK OFFICE
CERTIFICATE OF CORRECTION

PATENT NO. : 7,254,779 B1
APPLICATION NO. : 09/711369
DATED : August 7, 2007
INVENTOR(S) : Babak Rezvani et al.

Page 1 of 1

It is certified that error appears in the above-identified patent and that said Letters Patent is hereby corrected as shown below:

Column 1, Line 47, delete "are"

Column 4, Line 20, change "broker. An" to --broker, an--

Column 4, Line 36, delete "a"

Column 4, Line 62, change "a" to --at--

Column 6, Line 11, change "including," to --including--

Column 10, Line 64, insert --the-- before "art"

Column 12, Line 2, change "as" to --was--

Column 13, Line 5, change "pointer" to --pointed--

Column 13, Line 10, insert --as-- after "such"

Column 14, Line 17, change "skilled" to --skill--

Signed and Sealed this

Twenty-fifth Day of December, 2007

JON W. DUDAS
*Director of the United States Patent and Trademark Office*